(12) United States Patent
Plueg et al.

(10) Patent No.: US 8,680,188 B2
(45) Date of Patent: Mar. 25, 2014

(54) PIGMENT DISPERSER AND EASILY DISPERSED SOLID PIGMENT PREPARATIONS

(71) Applicants: Carsten Plueg, Muehltal/Niederbeerbach (DE); Jesus Pitarch Lopez, Frankfurt am Main (DE); Alexander Woerndle, Frankfurt am Main (DE)

(72) Inventors: Carsten Plueg, Muehltal/Niederbeerbach (DE); Jesus Pitarch Lopez, Frankfurt am Main (DE); Alexander Woerndle, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/895,842

(22) Filed: May 16, 2013

(65) Prior Publication Data

US 2013/0253104 A1 Sep. 26, 2013

Related U.S. Application Data

(62) Division of application No. 12/810,240, filed as application No. PCT/EP2009/002324 on Mar. 31, 2009, now Pat. No. 8,466,219.

(30) Foreign Application Priority Data

Apr. 30, 2008 (DE) .................. 10 2008 021 511

(51) Int. Cl.
| | | |
|---|---|---|
| C09D 11/10 | (2006.01) | |
| C08F 222/04 | (2006.01) | |
| C08K 5/00 | (2006.01) | |
| C08K 5/13 | (2006.01) | |
| C08L 39/00 | (2006.01) | |
| C08L 37/00 | (2006.01) | |

(52) U.S. Cl.
USPC ........... 524/272; 524/549; 524/548; 524/324; 524/93; 526/272

(58) Field of Classification Search
USPC ............ 524/272, 549, 548, 324, 93; 526/272
See application file for complete search history.

(56) References Cited

U.S. PATENT DOCUMENTS

| | | | |
|---|---|---|---|
| 4,866,136 A * | 9/1989 | MacLeay | .................... 525/327.6 |
| 5,369,198 A | 11/1994 | Albrecht et al. | |
| 5,705,603 A * | 1/1998 | Krull et al. | ..................... 528/332 |
| 6,406,143 B1 | 6/2002 | Chen et al. | |
| 6,423,785 B1 | 7/2002 | Esselborn et al. | |
| 7,442,724 B2 | 10/2008 | Esselborn et al. | |
| 8,129,476 B2 | 3/2012 | Grobelt et al. | |
| 2005/0085563 A1 | 4/2005 | Esselborn et al. | |
| 2010/0022662 A1 | 1/2010 | Grobelt et al. | |
| 2011/0288209 A1 | 11/2011 | Beck et al. | |

FOREIGN PATENT DOCUMENTS

| | | |
|---|---|---|
| DE | 10348825 | 6/2005 |
| EP | 0303281 | 2/1989 |
| EP | 0688796 | 12/1995 |
| EP | 1026178 | 8/2000 |
| EP | 1046685 | 6/2003 |
| WO | WO 97/47566 | 12/1997 |
| WO | WO 2004/019858 | 3/2004 |
| WO | WO 2007/039603 | 4/2007 |
| WO | WO 2008/080580 | 7/2008 |
| WO | WO 2008/122606 | 10/2008 |

OTHER PUBLICATIONS

PCT International Search Report for PCT/EP2009/002324, mailed Apr. 6, 2009.
English Translation of the International Report on Patentability for PCT/EP2009/002324, mailed Nov. 18, 2010.

* cited by examiner

*Primary Examiner* — Michael Bernshteyn
(74) *Attorney, Agent, or Firm* — Anthony A. Bisulca

(57) ABSTRACT

The invention relates to reaction products of amines with polymers containing dicarboxylic acids anhydride groups, method for the production thereof and use thereof as a dispersing additive for pigments. The invention also relates to solid pigment preparations containing said reaction products.

10 Claims, No Drawings

PIGMENT DISPERSER AND EASILY DISPERSED SOLID PIGMENT PREPARATIONS

CROSS REFERENCE TO RELATED APPLICATION

This application is a divisional application of co-pending U.S. patent application Ser. No. 12/810,240, filed Jun. 23, 2010, the entirety of which is hereby incorporated herein by reference.

The present invention provides reaction products of amines with polymers comprising dicarboxylic anhydride groups, the process for preparing said reaction products and their use as dispersing additives for pigments. The invention additionally relates to solid pigment preparations comprising these reaction products.

Quality in the production of pigmented coatings is decisively dependent upon achieving a fine and uniform distribution of the particles of solid material in the coating system. If the particles of pigment are not optimally dispersed and stabilized in the application system, flocculation phenomena and sedimenting can occur and can lead to undesirable changes in the viscosity of the application system, to hue changes and losses of color strength, hiding power, luster, homogeneity, brilliance and also poorly reproducible hues and to higher tendency to sag in the case of finishes.

To facilitate fine dispersion and stabilization of pigments in paint systems, printing inks and finishes and hence to achieve optimum performance characteristics, wetting and dispersing agents are frequently used.

DE 103 48 825 discloses copolymers based on styrene oxide-containing alkenyl ethers and unsaturated carboxylic acid derivatives and used in the production of aqueous pigment formulations.

EP 1 026 178 describes maleic anhydride copolymers comprising amine oxide groups as useful dispersants for pigments processed in aqueous pigment pastes.

Dispersing pigments in an application system is a critical and far from straightforward operation. In general, pigments are incorporated in a liquid phase in combination with dispersing and wetting agents through the use of energy-intensive ball mills, stirred media mills or high-performance bead mills. In comparison, easily dispersible solid pigment preparations can be incorporated in the application system with significantly lower energy input and faster color development, which is of substantial economic advantage.

The solid pigment preparations described in WO 2007/039603 provide an improvement regarding compatibility in application media differing in polarity. The dispersing additives used for producing such pigment preparations consist of a polymeric backbone synthesized by chain reaction and bearing side chains based on hydrophilic polyethers. The reaction product of a styrene-maleic anhydride copolymer with a polyether amine is mentioned as an example of such dispersing additives. The pigment preparations described are easy to disperse in both waterborne and solventborne finishes, although dispersion in very hydrophobic finish systems, such as solventborne industrial finishes based on long oil alkyd resins for example, is not sufficient.

EP 0 688 796 A1 discloses the reaction products of polyether amines with polymers of alpha,beta-unsaturated dicarboxylic acids, that are used as flow improvers in petroleum distillates.

U.S. Pat. No. 5,369,198 discloses maleic acid-vinyl copolymers comprising polyalkylene glycol esters.

WO 97/47566 discloses maleimide copolymers for cementitious slurries.

U.S. Pat. No. 6,406,143 B1 discloses amido-containing styrene-maleate graft copolymers for inkjet inks.

There is a need for dispersing additives that make it possible to provide universally easily dispersible solid pigment preparations. Universal is to be understood as referring to solid pigment preparations displaying easy dispersibility in hydrophilic and lipophilic application media alike. Such easily dispersible pigments shall be widely compatible and their incorporation shall take place equally easily and without additional steps irrespective of the application medium. Easily dispersible is to be understood as meaning that the pigment is incorporable in the application medium with very low energy input and rapid color development. Gentle shearing forces, for example the action of a dissolver (saw-tooth stirrer), are sufficient to achieve optimum dispersion of the pigment, removing the need for any further cost-intensive dispersing steps in the application system (bead milling for example).

We have found that, surprisingly, hereinbelow defined polymeric dispersing additives, which are obtainable by reacting certain amines with copolymers of alpha,beta-unsaturated dicarboxylic acids, make it possible to provide solid pigment preparations which are easy to disperse in hydrophilic and lipophilic application media alike.

The present invention accordingly provides copolymers consisting of the following structural units:

0 to 20 mol %, preferably 0.5 to 10 mol %, of structural unit A

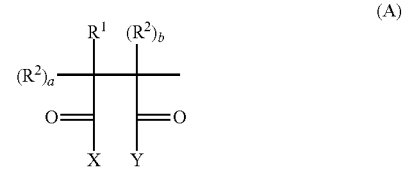

0 to 20 mol %, preferably 0.5 to 10 mol %, of structural unit B

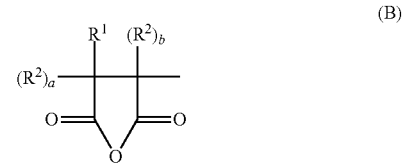

1 to 79 mol %, preferably 2 to 46 mol %, of structural unit C

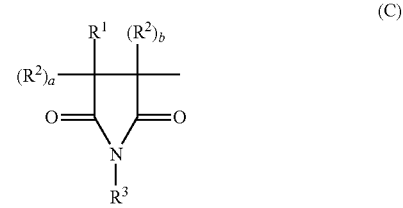

1 to 79 mol %, preferably 2 to 46 mol %, of structural unit D

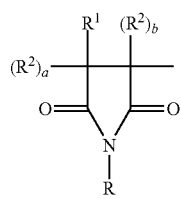

and 20 to 80 mol %, preferably 50 to 75 mol %, of structural unit E

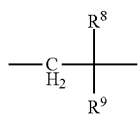

where $R^1$ and $R^2$ are each independently hydrogen, methyl or methylene, a, b are each zero or one and a+b is one, $R^3$ is $C_1$-$C_{40}$-alkyl, $C_5$-$C_{30}$-cycloalkyl, $C_6$-$C_{30}$-aryl, $C_1$-$C_4$-alkylene-$C_6$-$C_{30}$-aryl, $C_3$-$C_{30}$-hetaryl, $C_1$-$C_4$-alkylene-$C_3$-$C_{30}$-hetaryl or $C_2$-$C_{40}$-alkenyl, X and Y are each independently —OH, —O—$C_1$-$C_{30}$-alkyl, $NR^4R^5$, —O$^-$N$^+$H$_2$R$^4$R$^5$, $R^4$ and $R^5$ are each independently hydrogen, $R^3$ or R, R is

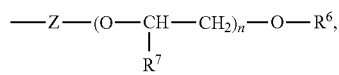

Z is $C_2$-$C_4$-alkylene, n is a number between 1 and 1000, $R^6$ is hydrogen, $C_1$-$C_{30}$-alkyl, $C_5$-$C_{12}$-cycloalkyl or $C_6$-$C_{30}$-aryl, $R^7$ is hydrogen, $C_1$-$C_4$-alkyl, $R^8$ is hydrogen or $C_1$-$C_4$-alkyl, and $R^9$ is $C_1$-$C_{60}$-alkyl or $C_6$-$C_{10}$-aryl.

The aforementioned alkyl, alkenyl, cycloalkyl, aryl and hetaryl radicals may be substituted. Examples of suitable substituents are ($C_1$-$C_6$)-alkyl, halogens, such as fluorine, chlorine, bromine and iodine, preferably chlorine, and ($C_1$-$C_6$)-alkoxy.

In a preferred embodiment, $R^3$ is $C_8$-$C_{30}$-alkyl, more particularly $C_{12}$-$C_{30}$-alkyl, $C_8$-$C_{30}$-alkenyl, more particularly $C_{12}$-$C_{30}$-alkenyl, benzyl or N-propylene imidazole. It is very particularly preferred for $R^3$ to be oleyl, stearyl or N-propylene imidazole.

Specifically, the structural units A, B, C and D are derived from alpha,beta-unsaturated dicarboxylic anhydrides of the general formula H and/or G

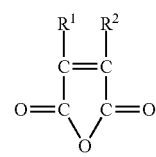

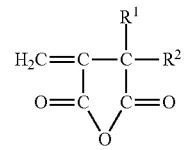

Examples are maleic anhydride, itaconic anhydride, citraconic anhydride, preferably maleic anhydride.

The structural units E are derived from the olefins of the general formula (I):

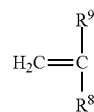

The following olefins may be mentioned by way of example: styrene, alpha-methylstyrene, dimethylstyrene, alpha-ethylstyrene, diethylstyrene, i-propylstyrene, tert-butylstyrene, diisobutylene, and alpha-olefins, such as decene, dodecene, tetradecene, pentadecene, hexadecene, octadecene, $C_{20}$-alpha-olefin, $C_{24}$-alpha-olefin, $C_{30}$-alpha-olefin, tripropenyl, tetrapropenyl, pentapropenyl and also mixtures thereof. Preference is given to alpha-olefins having 10 to 24 carbon atoms and styrene; styrene is particularly preferred.

The polymers of the present invention, comprising dicarboxylic anhydride groups, are preferably prepared by free-radical copolymerization of the olefinically unsaturated dicarboxylic anhydrides (G and/or H) with vinyl compounds (E).

Examples of suitable commercially available polymers comprising dicarboxylic anhydride groups and already comprising the structural units G and/or H and also E are for example the styrene-maleic anhydride resins marketed by Sartomer or Cray Valley as Sartomer® SMA 2000, or alpha-olefin-maleic anhydride copolymers as marketed for example by Philips-Chevron as PA®-18, or obtained by reaction of corresponding alpha-olefins with maleic anhydride.

It is also possible to use commercially available polymers which already include structural units A, for example the styrene-maleic anhydride-monobutyl maleate-monomethyl maleate copolymers marketed by Hercules as Scripset® 550.

The dispersing additives of the present invention are preferably prepared using styrene-maleic anhydride resins as polymers comprising dicarboxylic anhydride groups, provided the molar ratio of maleic anhydride to styrene is between 1:1 and 1:3.

The NR radical in structural unit D derives from the reaction products of the dicarboxylic anhydride groups with polyether amines of the general formula D1

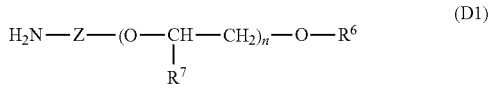

$$H_2N-Z-(O-CH-CH_2)_n-O-R^6 \quad (D1)$$
$$\phantom{H_2N-Z-(O-C}|\phantom{H-CH_2)_n-O-R^6}$$
$$\phantom{H_2N-Z-(O-C}R^7$$

where Z, $R^6$, $R^7$ and n are each as defined above. Such polyether monoamines are known and commercially available for example from Huntsman under the names of Jeffamine® and Surfonamine®.

The $NR^3$ radical in structural unit C derives from the reaction products of the dicarboxylic anhydrides with primary amines. Suitable amines are for example saturated and unsaturated, aliphatic and cycloaliphatic amines such as methylamine, ethylamine, n-propylamine, isopropylamine, n-butylamine, hexylamine, cyclohexylamine, 2-ethylhexylamine, octylamine, decylamine, dodecylamine, tetradecylamine, hexadecylamine, octadecylamine, octadecenylamine, coco fatty amine, dehydroabietylamine, oleylamine, stearylamine and tallow fatty amine and also aliphatic and cycloaliphatic amines bearing aromatic radicals, such as benzylamine, 1-phenylethylamine, 2-phenylethylamine and 3-phenylpropylamine, more particularly N-containing heteroaromatic radicals such as for example 2-(aminomethyl)pyridine, 3-(aminomethyl)pyridine, 1-aminoindane and N-(3-aminopropyl)imidazole, and also aromatic amines such as aniline, aminonaphthalene, aminonaphthol, aminofluorene, aminoanthracene, aminopyrene and specifically heterocyclic amine compounds, for example aminopyridine, aminocarbazole, aminoquinoline, aminopyrimidine, aminopurine, adenine, aminotriazole, aminobenzimidazole, aminobenzimidazolone, aminothiazole, aminobenzothiazole, aminopyrazole, aminopyrazolone and aminothiadiazole.

The X and Y radicals derive from the reaction products of the dicarboxylic anhydride groups with water or with alcohols of the formula HO—$(C_1-C_{30})$-alkyl and/or amines of the formula $HNR^4R^5$.

Useful primary amines include for example those mentioned above.

As secondary amines there may be mentioned by way of example: didecylamine, ditetradecylamine, distearylamine, dicoco fatty amine, ditallow fatty amine and mixtures thereof.

As alcohols there may be mentioned by way of example: methanol, ethanol, propanol, isopropanol, n-, sec-, tert-butanol, octanol, tetradecanol, hexadecanol, octadecanol, tallow fatty alcohol, behenyl alcohol and mixtures thereof.

There are various modes of carrying out the process for preparing the dispersing additives of the present invention. Preferably, the above-described polymers comprising dicarboxylic anhydride groups are made to react, in one reaction step, with a mixture of the recited amino and optionally hydroxy compounds.

The options are either
a) to initially charge the mixture of amino and optionally hydroxy compounds and to add the polymer comprising dicarboxylic anhydride groups; or preferably b) to initially charge the polymer comprising dicarboxylic anhydride groups and add the mixture of amino and optionally hydroxy compounds.

The amount of amine used is in a molar ratio between 0.01 and 1 relative to dicarboxylic anhydride, preferably between 0.1 and 0.99 and more preferably between 0.5 and 0.95 mol of amine per mole of dicarboxylic anhydride.

The molar ratio between the structural units C and D is between 0.01 and 10, preferably 0.1 to 5 and more preferably 0.15 to 3.5 mol of structural unit C per mole of structural unit D.

The reaction products of the present invention are prepared without a solvent or in organic solvents which are inert to the reaction partners or whose reactivity to the reaction partners is negligible and in which the reactants and also the reaction products are at least partially but preferably completely soluble. Useful organic solvents include for example hydrocarbons, more particularly aromatic hydrocarbons such as toluene, xylenes, ethylbenzenes, chlorinated hydrocarbons such as 1,2-dichloroethane, trichloroethane and more particularly chlorobenzenes, ketones, preferably propanone, ethyl methyl ketone, isobutyl methyl ketone and alcohols, preferably butanol, isobutanol, pentanol and hexanol, ethylene glycol ether and propylene glycol ether, for example ethylene glycol monomethyl ether, ethylene glycol monoethyl ether, diethylene glycol monomethyl ether, diethylene glycol monoethyl ether, diethylene glycol monobutyl ether, ethylene glycol dimethyl ether, ethylene glycol diethyl ether, diethylene glycol dimethyl ether, propylene glycol monomethyl ether, propylene glycol monoethyl ether, reaction products of alcohols with ethylene oxide such as for example fatty acid alcohol ethoxylates such as octyl alcohol ethoxylates, decyl alcohol ethoxylates, dodecyl alcohol ethoxylates, tetradecyl alcohol ethoxylates, hexadecyl alcohol ethoxylates, octadecyl alcohol ethoxylates, octadecenyl alcohol ethoxylates, coca fatty alcohol ethoxylates, oleyl alcohol ethoxylates and stearyl alcohol ethoxylates, esters such as for example n-butyl acetate, methyl glycol acetate and ethyl glycol acetate and also amides such as dimethylformamide and N-methyl-2-pyrrolidone. Depending on the field of application, the solvents can either remain in the reaction mixture, in which case the solids content of the solution is preferably up to 40% by weight, more particularly 15% to 30% by weight, or they are removed by distillation.

The reaction for preparing the dispersing additives of the present invention may optionally be carried out in the presence of a catalyst, such as tertiary amines for example.

The amides and imides represented in the structural units A, C and D of the dispersing additives of the present invention are formed by reacting the polymer comprising dicarboxylic anhydride groups with above-described primary (for structural units C and D, optionally A) and secondary (for structural unit A) amines at temperatures between 100 and 200° C., preferably 130 and 180° C. The reactants are preferably contacted initially at elevated temperature of 40° C. to 120° C., while the temperature is later raised to 140° C. to 180° C., preferably 160° C. to 170° C.

The presence of the structural units C and D in the dispersing additives of the present invention can be unequivocally verified by means of IR spectroscopy, since imides have a characteristic absorption at 1700 $cm^{-1}$ in the IR spectrum.

The present invention further provides easily dispersible solid pigment preparations comprising the reaction products of the present invention as well as pigments.

Preferred pigment preparations comprise
5% to 99% by weight, more particularly 40% to 95% by weight, of at least one pigment,
1% to 95% by weight, more particularly 5% to 60% by weight, of a present invention copolymer as described above, and
0 to 10% by weight, preferably 0.01% to 5% by weight, of an auxiliary from the group consisting of fillers, flame retardants, preservatives, photoprotectants, pigmentary and non-pigmentary dispersants, surfactants, antioxidants, defoamers, resins and antistats, each based on the total weight of the pigment preparation.

Organic pigments are preferred. Useful organic pigments include monoazo, disazo, lacked azo, β-naphthol, Naphthol AS, benzimidazolone, disazo condensation, azo metal complex pigments, and polycyclic pigments such as for example phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or an acidic to alkaline carbon black from the group consisting of furnace blacks and gas blacks.

Of the organic pigments mentioned, particularly suitable ones are in a very fine state of subdivision for preparing the preparations in that preferably 95% and more preferably 99% of the pigment particles have a particle size ≤500 nm.

An exemplary selection of particularly preferred organic pigments includes carbon black pigments, for example gas or furnace blacks; monoazo and disazo pigments, in particular the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and Naphthol AS pigments, in particular the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, in particular the Colour Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, in particular the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, in particular the Colour Index pigments Pigment Yellow 139 or Pigment Yellow 173; phthalocyanine pigments, in particular the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone and thioindigo pigments, in particular the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, in particular the Colour Index pigments Pigment Red 169, Pigment Blue 56 or Pigment Blue 61; diketopyrrolopyrrole pigments, in particular the Colour Index pigments Pigment Red 254, Pigment Red 255, Pigment Red 264, Pigment Red 270, Pigment Red 272, Pigment Orange 71, Pigment Orange 73, Pigment Orange 81.

The pigment preparations of the present invention may include customary auxiliaries from the group consisting of fillers, flame retardants, preservatives, photoprotectants, pigmentary and nonpigmentary dispersants, surfactants, antioxidants, resins, defoamers and antistats, preferably in the customary amounts of 0.1% to 20% by weight, based on the total weight of the pigment preparation.

Examples of customary surfactants which may be included in the pigment preparations of the present invention are: alkyl sulfates such as for example lauryl sulfate, stearyl sulfate or octadecyl sulfate, primary alkyl sulfonates such as for example dodecyl sulfonate, and secondary alkyl sulfonates, more particularly the $C_{13}$-$C_{17}$-alkanesulfonate sodium salt, alkyl phosphates, alkylbenzenesulfonates such as for example dodecylbenzenesulfonic acid, similarly salts of these compounds. It is further possible to use soy lecithin and also condensation products of fatty acid and taurine or hydroxyethanesulfonic acid, similarly alkoxylation products of alkylphenols, castor oil rosin esters, fatty alcohols, fatty amines, fatty acids and fatty acid amides, these alkoxylation products can similarly be equipped with ionic end groups, for example as sulfosuccinic monoesters or else as sulfonic, sulfuric and phosphoric esters, and also their salts, the sulfonates, sulfates or phosphates. Similarly suitable are alkoxylated addition compounds obtained by reaction of polyepoxides with amines or bisphenol A or bisphenol A derivatives with amines, and also urea derivatives.

The present invention further provides a process for producing the pigment preparations of the present invention, characterized in that a pigment in the form of powder, granulate or presscake is mixed with the copolymer of the present invention and optionally said auxiliaries in the presence of water or an organic solvent or a mixture of water and organic solvent.

Particularly advantageous mixing can be achieved through the use of a grinding or dispersing assembly. As such, stirred systems, dissolvers (saw-tooth stirrers), rotor-stator mills, ball mills, stirred media mills, such as sand and bead mills, high-speed mixers, kneading apparatus, roll stands or high-performance bead mills can be used. The fine dispersing/grinding of the pigments is carried on to the desired particle size distribution and can take place at temperatures in the range from 0 to 100° C., advantageously at a temperature between 10 and 70° C., preferably at 20 to 60° C.

Depending on the type of pigment, the pigment suspension obtained can be subjected to a finishing operation. The finishing operation is advantageously carried out in the existing organic solvent, water or water-solvent mixture at a temperature of 50 to 250° C., particularly 70 to 200° C., especially 100 to 190° C., and advantageously for a period in the range from 5 minutes to 24 hours, particularly 5 minutes to 18 hours, especially 5 minutes to 6 hours. The finishing operation is preferably carried out at the boiling temperature, especially at temperatures above the boiling point of the solvent system under superatmospheric pressure. When a purely aqueous pigment dispersion is preferred, any solvent used can be removed by means of a steam distillation.

The pigment preparations obtained by following the process according to the present invention can if necessary be isolated in solid form, for example by filtration, decanting, centrifugation, spray drying, fluidized bed drying, belt drying, spray granulation or drying in a paddle dryer. The pigment preparations according to the present invention are preferably isolated by filtration and final drying. When the pigment preparation obtained has a coarse particle size, it is advantageously additionally subjected to a dry grinding operation.

The pigment preparations according to the present invention are useful for pigmenting and coloring natural and synthetic materials of any kind, in particular paints, coating systems, such as wallpaper colors, printing inks, emulsion and varnish colors, that are water and/or solvent containing.

The pigment preparations according to the present invention are further useful for coloration of macromolecular materials of any kind, for example natural and synthetic fiber materials, preferably cellulose fibers, but also for paper pulp dyeing and also laminate coloration. Further applications are the manufacture of printing inks, for example textile print pastes, flexographic printing inks, decorative printing colors or gravure printing inks, wallpaper colors, water-thinnable varnishes, wood preservation systems, viscose dope dyeings, varnishes, sausage casings, seed, fertilizers, glass, in particular glass bottles, and also for mass coloration of roof shingles, as colorants in electrophotographic toners and developers, for coloration of renders, concrete, woodstains, colored pencil leads, felt tip pens, waxes, paraffins, graphics inks, ballpoint pen pastes, chalks, washing and cleaning compositions, shoe care agents, latex products, abrasives and also for coloring plastics, or high molecular weight materials of any kind. High molecular weight organic materials include for example cellulose ethers and esters, such as ethylcellulose, nitrocellulose, cellulose acetate or cellulose butyrate, natural resins or synthetic resins, such as addition polymerization resins or condensation resins, for example aminoplasts, in particular urea- and melamine-formaldehyde resins, alkyd resins, acrylic resins, phenoplasts, polycarbonates, polyolefins, such as polystyrene, polyvinyl chloride, polyethylene, polypropylene, polyacrylonitrile, polyacrylic esters, polyamides, polyurethanes or polyesters, rubber, caseine, latices, silicone, silicone resins, individually or mixed.

The pigment preparations of the present invention are further useful in the manufacture of inkjet inks, for example on an aqueous or nonaqueous basis ("solvent-based"), microemulsion inks, UV-curable inks as well as inkjet inks which function according to the hotmelt process, in particular for those which are based on the bubble jet or piezo process. These inks can be used to print paper but also natural or synthetic fiber materials, foils, and plastics.

The pigment preparations of the present invention can further be used for printing all manner of coated or uncoated substrate materials, for example for printing paperboard, cardboard, wood and woodbase materials, metallic materials, semiconductor materials, ceramic materials, glasses, glass and ceramic fibers, inorganic materials, concrete, leather, food products, cosmetics, skin and hair. The substrate material in question may be two-dimensionally planar or spatially extended, i.e., three-dimensionally structured, and be printed or coated both completely or only partially.

The pigment preparations according to the present invention are also useful as colorants for color filters for flat panel displays not only for additive but also subtractive color generation, also for photoresists and also as colorants for electronic inks ("e-inks") or electronic paper ("e-paper").

The present invention also provides a process for coloring a high molecular weight organic material, which comprises uniformly dispersing an effectively pigmenting amount of a pigment preparation of the present invention in the organic material by stirring the pigment preparation into a suspension or solution of the organic material. Stirring is to be understood as meaning any kind of mixing using minimal shearing forces, including shaking for example. An effectively pigmenting amount is usually between 0.01% and 40% by weight of pigment preparation, based on the weight of the organic material to be pigmented.

Examples

General Prescription for Preparing Inventive Dispersing Additives

A polymer comprising dicarboxylic anhydride groups (31 mmol of anhydride) is mixed at 25° C. with a polyether amine of the formula D1 (18 mmol of primary amine, for producing structural unit D) and an amine of the formula $H_2N$—$R^3$ (10 mmol of primary amine, for producing structural unit C). The reaction mixture is then stirred at 175° C. under vacuum for 3 hours. Next the mixture is cooled down to room temperature to obtain a yellowish brown liquid of medium viscosity.

| Example | Dicarboxylic anhydride polymer | D1 | $H_2NR^3$ | IR (cm−1) | Acid number (mg KOH/g) |
| --- | --- | --- | --- | --- | --- |
| 1 | Sartomer ® SMA200 | Surfonamin ® L-207 | oleylamine | 1779, 1700 | 12.4 |
| 2 | Sartomer ® SMA200 | Surfonamin ® L-207 | benzylamine | 1779, 1700 | 14.4 |
| 3 | Sartomer ® SMA200 | Surfonamin ® L-207 | dodecylamine | 1779, 1700 | 16 |
| 4 | Sartomer ® SMA200 | Surfonamin ® L-207 | octylamine | 1779, 1700 | 14.5 |
| 5 | Sartomer ® SMA200 | Surfonamin ® L-207 | N-(3-aminopropyl)-imidazole | 1779, 1700 | 5.3 |
| 6 Reference example | Sartomer ® SMA200 | Surfonamin ® L-207 | — | 1779, 1700 | 28 |

General Prescription for Producing Inventive Pigment Preparations:

50 g of Hostaperm® Rosa E (C.I. No. 73915) are suspended in a mixture of 400 g of water and 250 g of isobutanol until homogeneous. Next 11 g of a dispersant from one of Examples 1 to 6 are added, and the mixture is dispersed by means of a T25 Ultra-Turrax® at 6500 rpm for 15 min. Next the isobutanol is distilled off and the coated pigment is filtered off, washed with water and dried at 80° C. in a drying cabinet. After dry grinding (M20 Universal mill, IKA) 56 g of pulverulent pigment preparation are obtained.

To evaluate the easy dispersibility in varnish systems of differing polarity, the pigment preparations from Examples 1 to 6 are tested by dissolver dispersion in an air-drying long oil alkyd resin baking finish comprising white spirit (LA finish) and in a waterborne emulsion paint for exteriors (WEP).

General Prescription for Pigmenting a Solventborne LA Finish:

A dissolver equipped with a 4 cm toothed disc was used to disperse 14.4 g of the easily dispersible pigment preparation in 45.6 g of the long oil alkyd resin grind varnish for 30 min at 40° C. and 10 000 rpm. 15 g of this pigmented grind varnish were admixed at room temperature with 15 g of a letdown mix and 60 g of a clearcoat mix by slowly stirring with a glass rod.

To prepare the white reduction, 6.75 g of the above masstone varnish were homogenized with 20 g of long oil alkyd resin white varnish (27% of $TiO_2$) by simple manual stirring. The paints thus produced were drawn down as a 200 μm film on test card and dried initially at room temperature for 15 min and then at 60° C. in a drying cabinet for 60 min.

General Prescription for Pigmenting a Waterborne Emulsion Paint:

A dissolver equipped with a 4 cm toothed disc was used to disperse 36.0 g of the easily dispersible pigment preparation in 42.0 g of a grind mix for 30 min at 20° C. and 8000 rpm. To prepare the white reduction, 2 g of the pigmented grind mix were homogenized with 100 g of waterborne white dispersion (20% of $TiO_2$) by simple manual stirring. The paints thus produced were drawn down as a 200 μm film on test card and dried at room temperature for 60 min.

The following numerical values of color strength and cleanness are relative to the reference example.

| Dispersing additive | LA finish | | WEP |
| | Color strength | dC | Color strength |
| --- | --- | --- | --- |
| Example 1 | 118% | 0.76 | 100% |
| Example 2 | 101% | 0.10 | 100% |
| Example 3 | 116% | 0.80 | 101% |
| Example 4 | 108% | 0.13 | 107% |
| Example 5 | 119% | 0.49 | 100% |
| Example 6 - reference | 100% | | 100% | dC > 0 indicates a cleaner color being perceived.
The dC values in the case of the waterborne emulsion paints are within the specification of the reference example (absolute dC value <0.40).

Introducing structural unit C in the pigment dispersant improves the dispersibility of pigment preparations in hydrophobic solventborne long oil alkyd resins without impairing good dispersibility in waterborne emulsion paints. Thus, the pigment preparations of the present invention possess genuine universal utility.

What is claimed is:

1. A solid pigment preparation comprising
(a) 5% to 99% by weight of at least one pigment,
(b) 1% to 95% by weight of a copolymer consisting of the following structural units:
0 to 20 mol % of structural unit A

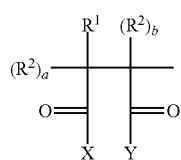

0 to 20 mol % of structural unit B

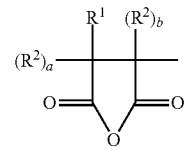

1 to 79 mol % of structural unit C

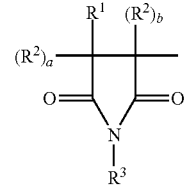

1 to 79 mol % of structural unit D

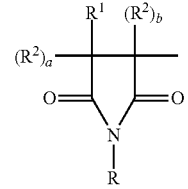

and
20 to 80 mol % of structural unit E

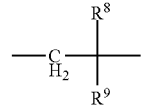

wherein
$R^1$ and $R^2$ are each independently hydrogen, methyl or methylene,
a, b are each zero or one and a+b is one,
$R^3$ is $C_8$-$C_{30}$-alkenyl, benzyl or N-propylene imidazole,
X and Y are each independently —OH, —O—$C_1$-$C_{30}$-alkyl, $NR^4R^5$ or —$O^-N^+H_2R^4R^5$,
$R^4$ and $R^5$ are each independently hydrogen, $R^3$ or R,
R is

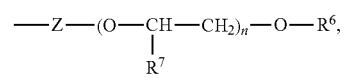

Z is $C_2$-$C_4$-alkylene,
n is a number between 1 and 1000,
$R^6$ is hydrogen, $C_1$-$C_{30}$-alkyl, $C_5$-$C_{12}$-cycloalkyl or $C_6$-$C_{30}$-aryl,
$R^7$ is hydrogen or $C_1$-$C_4$-alkyl,
$R^8$ is hydrogen or $C_1$-$C_4$-alkyl, and
$R^9$ is $C_1$-$C_{60}$-alkyl or $C_6$-$C_{10}$-aryl; and
(c) 0 to 10% by weight of an auxiliary selected from the group consisting of fillers, flame retardants, preservatives, photoprotectants, pigmentary dispersants, nonpigmentary dispersants, surfactants, antioxidants, defoamers, resins, antistats, each based on the total weight of the pigment preparation.

2. The pigment preparation as claimed in claim 1, wherein the pigment is selected from the groups consisting of the monoazo, disazo, lacked azo, β-naphthol, Naphthol AS, benzimidazolone, disazo condensation, azo metal complex pigments, phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or the acidic to alkaline carbon blacks selected from the group consisting of furnace blacks and gas blacks.

3. A process for producing the pigment preparation as claimed in claim 1, wherein the pigment in the form of powder, granulate or presscake and is mixed with the copolymer in the presence of water or an organic solvent or a mixture of water and organic solvent.

4. The process as claimed in claim 3, wherein the pigment preparation is isolated in solid form by filtration and final drying.

5. A pigmented natural or synthetic material comprising the pigment preparation as claimed in claim 1.

6. The pigmented natural or synthetic material as claimed in claim 5 wherein the pigmented natural or synthetic material is selected from the group consisting of an aqueous paint, emulsion color, varnish color, water-thinnable varnishes, wallpaper colors or printing inks.

7. A pigmented solvent-containing paint, emulsion color varnish color, wallpaper color or printing ink pigmented by a pigment preparation as claimed in claim 1.

8. A pigmented solvent-containing color based on alkyd resin varnishes pigmented by the pigment preparation as claimed in claim 1.

9. A composition pigmented or dyed by the pigment preparation as claimed in claim 1, wherein the composition is selected from the group consisting of a natural fiber, synthetic fiber, paper pulp laminate coloration, inkjet inks, electrophotographic toners, powder coatings, color filters, electronic inks, electronic paper, wood preservation systems, viscose dope dyeing, sausage casings, seed, fertilizers, glass bottles, roof shingles, renders, concrete, wood stains, colored pencil leads, felt tip pens, waxes, paraffins, graphics inks, ballpoint pen pastes, chalks, washing compositions, cleaning compositions, shoe care agents, latex products, abrasives or plastics.

10. A process for coloring a high molecular weight organic material, comprising the steps of uniformly dispersing the pigment preparation as claimed in claim 1 in the organic material by stirring the pigment preparation into a suspension or solution of the organic material.

* * * * *